(12) United States Patent
Shibatani (10) Patent No.: US 6,469,417 B2
(45) Date of Patent: Oct. 22, 2002

(54) TRUSS ACTUATOR

(75) Inventor: Kazuhiro Shibatani, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/802,946

(22) Filed: Mar. 12, 2001

(65) Prior Publication Data

US 2001/0022486 A1 Sep. 20, 2001

(30) Foreign Application Priority Data

Mar. 15, 2000 (JP) ........................................ 2000-072245

(51) Int. Cl.[7] ................................................. H02N 2/00
(52) U.S. Cl. ........................... 310/316.01; 310/323.02; 310/323.16
(58) Field of Search ....................... 310/316.01, 316.02, 310/323.01, 323.02, 323.04, 323.16, 323.17

(56) References Cited

U.S. PATENT DOCUMENTS

| | | | | |
|---|---|---|---|---|
| 4,613,782 A | * | 9/1986 | Mori et al. | 310/323.16 |
| 5,001,442 A | * | 3/1991 | Hannaie et al. | 331/25 |
| 5,062,622 A | * | 11/1991 | Kataoka et al. | 271/270 |
| 5,065,999 A | * | 11/1991 | Kataoka et al. | 271/265 |
| 5,477,099 A | * | 12/1995 | Suganuma | 310/316.01 |
| 5,508,579 A | * | 4/1996 | Suganuma | 310/316.01 |
| 5,563,478 A | * | 10/1996 | Suganuma | 318/116 |
| RE35,852 E | * | 7/1998 | Takagi | 318/116 |
| 6,201,340 B1 | * | 3/2001 | Matsuda et al. | 310/328 |

FOREIGN PATENT DOCUMENTS

| | | | |
|---|---|---|---|
| JP | 10-225151 | 8/1998 | ............ H02N/2/00 |
| JP | 11-69852 | 3/1999 | ............ H02N/2/00 |

* cited by examiner

*Primary Examiner*—Thomas M. Dougherty
(74) *Attorney, Agent, or Firm*—McDermott, Will & Emery (57) ABSTRACT

The present invention provides a truss actuator offering reduced noise, vibration and wear, which is capable of speed control of the driven member and can control the output to the driven member at a constant level regardless of fluctuations in the load on the actuator or in the environment in which the actuator is used.

In the truss actuator, one displacement unit 2 or 3 is driven and this oscillation is transmitted to the other displacement unit 3 or 2, and the truss actuator includes two displacement sensors 11 and 12 that respectively detect the displacement of the displacement units, a phase difference detecting unit 13 that detects via the displacement sensors the phase difference between the detected displacement values, a target phase difference setting unit (a CPU 20, etc.) that sets a target phase difference, a deviation determining unit 14 that determines the deviation of the phase difference from the phase difference detecting unit 13 and the target phase difference, and a frequency changing unit (a frequency control unit 15 and oscillator 16) that changes the oscillation frequency based on the result of this determination, wherein the frequency changing unit controls the oscillation frequency based on the result obtained by the deviation determining unit.

17 Claims, 9 Drawing Sheets

L: first LPF < second LPF
H: first LPF > second LPF

TRUSS ACTUATOR

This application is based on application No. JP 2000-72245 filed in Japan, the contents of which is hereby incorporated by reference.

BACKGROUND OF THE INVENTION

1. Field of the Invention

The present invention relates to an improved truss actuator drive control device in which two displacement units are connected at their respective ends and the driven member is driven by the above ends.

2. Description of the Related Art

One example of a known conventional truss actuator comprises a thin plate-shaped truss actuator comprising a piece of sheet steel cut out such that two displacement units cross each other at a right angle, and piezoelectric elements are applied to both sides of each displacement unit.

In order to drive a driven member using this actuator, a method is used in which the piezoelectric elements on the side of each displacement unit are caused to resonate such that the top of each crossing displacement unit is induced to diagonally collide with the driven member and move the driven member in a prescribed direction.

However, in the conventional drive method described above, because the tops of the sheet steel piece collide with the driven member in a linear fashion, the problems of significant noise and vibration arise as well as the problem that the sheet steel and driven member suffer substantial wear. In addition, because the method lacks a mechanism by which to detect the amount of displacement of the piezoelectric elements, the problem arises that it becomes difficult to control the speed of the driven member. Furthermore, because the conventional method lacks a mechanism by which to detect the displacement of the displacement units caused by the resonance driving, the displacement of the displacement units deviates from a prescribed value due to the fluctuation in the load on the actuator or in the environment in which the actuator is used, for example, and the output level to the driven member cannot be controlled at a constant level.

OBJECTS AND SUMMARY

The present invention was created in view of these problems, and an object thereof is to provide an improved truss actuator. In other words, an object of the present invention is to reduce noise, vibration and wear in a truss actuator. Another object of the present invention is to provide a truss actuator drive control device in which the speed of the driven member may be controlled. Furthermore, yet another object of the present invention is to provide a truss actuator drive control device that can control the output to the driven member at a constant level regardless of fluctuations in the load on the actuator or in the use environment.

In order to attain these and other objects, the truss actuator drive control device according to one aspect of the present invention is a drive control device for a single-side drive-type truss actuator that comprises a base frame, two displacement units each fixed to the base frame on the distal end such that the distal ends cross each other, a drive unit comprising a synthesizing unit located at the distal ends of the displacement units, and a pressure unit that causes the synthesizing unit to come into pressure contact with the driven member, which is the object of driving, wherein one of the two displacement unit is caused to oscillate and this oscillation is transmitted to the other driven displacement unit in order to drive the driven member, and wherein said drive control device includes two displacement detecting units that respectively detect the displacements of the two displacement units, a phase difference detecting unit that detects the phase difference between the detected displacement values of the displacement detecting units, a target phase difference setting unit that sets the target phase difference, a deviation determining unit that determines the deviation between the phase difference from the phase difference detecting unit and the target phase difference from the target phase difference setting unit, and a frequency changing unit that changes the drive frequency of the displacement unit based on the result of the determination by the deviation determining unit.

In the above aspect, one of the two displacement units is driven to oscillate, and this oscillation is transmitted to the other driven displacement unit, such that the driven member is driven. When this occurs, the phase difference between the displacements detected by each displacement detecting unit located on each displacement unit of the actuator is detected by the phase difference detecting unit. The deviation of the phase difference detected by the phase difference detecting unit and the target phase difference from the target phase difference setting unit, i.e., the imbalance of the detected phase difference relative to the target phase difference, is determined by the deviation determining unit, and based on the result of this determination, the frequency changing unit changes the oscillation frequency such that the above deviation is eliminated, and therefore, the detected phase difference and the target phase difference ultimately match each other, so that the output to the driven member may be controlled at a constant level regardless of fluctuations in the load on the actuator or in the use environment.

In the truss actuator drive control device according to another aspect of the present invention, a memory stores the target phase difference to be set in the target phase difference setting unit, and the target phase difference can be inputted by operator.

In the above aspect, because the target phase difference set by the target phase difference setting unit is changed depending on the target phase difference data stored in the memory, control may be performed such that the speed of the driven member may be changed to a desired speed.

The truss actuator drive control device according to another aspect of the present invention is a single-side drive-type truss actuator that comprises a base frame, two displacement units each fixed to the base frame on the distal end such that the distal ends cross each other, a drive unit comprising a synthesizing unit located at the distal ends of the displacement units, and a pressure unit that causes the synthesizing unit to come into pressure contact with the driven member, which is the object of driving, wherein one of the two displacement units is driven to oscillate and this oscillation is transmitted to the other driven displacement unit using a 90° target phase difference in order to drive the driven member, and wherein said drive control device includes two displacement detecting units that respectively detect the displacement of the two displacement units as a pulse signal, a phase difference detecting unit that detects the phase difference between the pulse signals output from the displacement detecting units, a first signal generating unit that generates a signal the level of which changes depending on the phase difference and based on the detection signal output from the phase difference detecting unit and a second signal generating unit that generates a signal the level of which changes in the opposite direction depending the phase difference and based on the detection signal output from the phase difference detecting unit, a deviation determining unit that determines the deviation between the two signals based on the two signals output from the first and second signal generating units, and a frequency changing unit that changes the drive frequency of the displacement unit based on the result of the determination by the deviation determining unit.

In the above aspect, because the levels of the signals output from the first and second signal generating units change in opposite directions, the median value of the signals becomes the target phase difference when the driven displacement unit is to be driven using a 90° target phase difference relative to the driving displacement unit. Consequently, the frequency may be changed by seeking the deviation of the detected phase difference from the target phase difference and based on the result thereof, such that the target phase difference setting unit may be eliminated.

Figure 2:
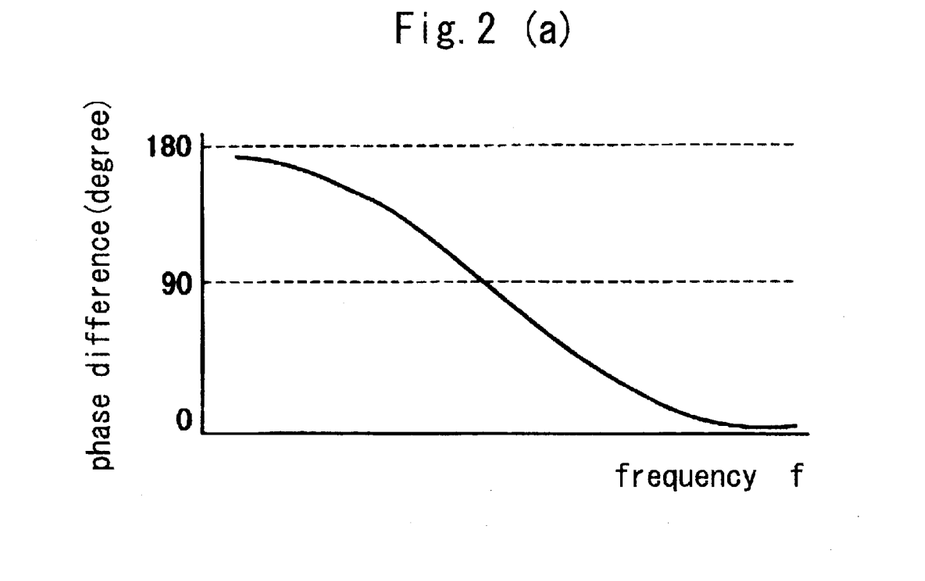
FIG. 2 comprises drawings showing the relationship between the drive frequency and the phase difference between the displacements when only one of the displacement units is driven, with FIG. 2(a) showing the case in which the phase of the driven displacement unit advances relative to the phase of the driving displacement unit, and FIG. 2(b) showing the case where the phase of the driven displacement unit is delayed relative to the phase of the driving displacement unit.

Here, where the phase difference between the driving displacement unit and the driven displacement unit is ±90°, the locus of the synthesizing unit becomes a circular locus, and in other cases (except for where the phase difference is 0°, when the locus becomes a linear locus), the locus of the synthesizing unit becomes an oval locus. Because the phase difference has the relationship with the drive frequency that is shown in FIG. 2 and described below, the synthesizing unit moves in a circular or oval fashion, noise and oscillation are reduced, and the wear of the synthesizing unit and driven member may be reduced.

In a specific construction representing the above aspect, the phase difference detecting unit may comprise a logic circuit that outputs a pulse signal having a duty ratio corresponding to the phase difference between the pulse signals output from the two displacement detecting units, the first signal generating unit may comprise a first smoothing circuit that smoothes the pulse signal output from the logic circuit, the second signal generating unit may comprise an inverter circuit that inverts the phase of the pulse signal output from the logical circuit and a second smoothing circuit that smoothes the pulse signal output from the inverter circuit, and the deviation determining unit may comprise a comparison circuit that compares the levels of the two signals respectively output from the first and second signal generating units.

In the truss actuator drive control device according to yet another aspect of the present invention, the two displacement units may each comprise a layered piezoelectric element, and the displacement detecting units may each comprise a detection circuit that detects the displacement of each piezoelectric element based on the value of the electric current that flows in the piezoelectric element.

The above aspect uses the relationship in which the displacement of the piezoelectric element is essentially proportional to the value of the electric current flowing therein, and therefore, detection of the values of the electric currents flowing in the piezoelectric element by the displacement detecting units enables speed control of the driven member.

In the truss actuator drive control device according to yet another aspect of the present invention, each of the displacement detecting units may be mounted on each of two displacement units and comprise a distortion gauge that detects the displacement thereof.

In the above aspect, because the displacement of each displacement unit is detected by a distortion gauge, inaccurate phase detection caused by the pulsation of the electric current value in the driving displacement unit that occurs when the value of the electric currant flowing in the layered piezoelectric element is detected when rectangular waves are directly used for the drive signal may be prevented.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawing.

DETAILED DESCRIPTION OF THE PREFERRED EMBODIMENTS

The present invention is specifically explained below with reference to the drawings.

Figure 1:
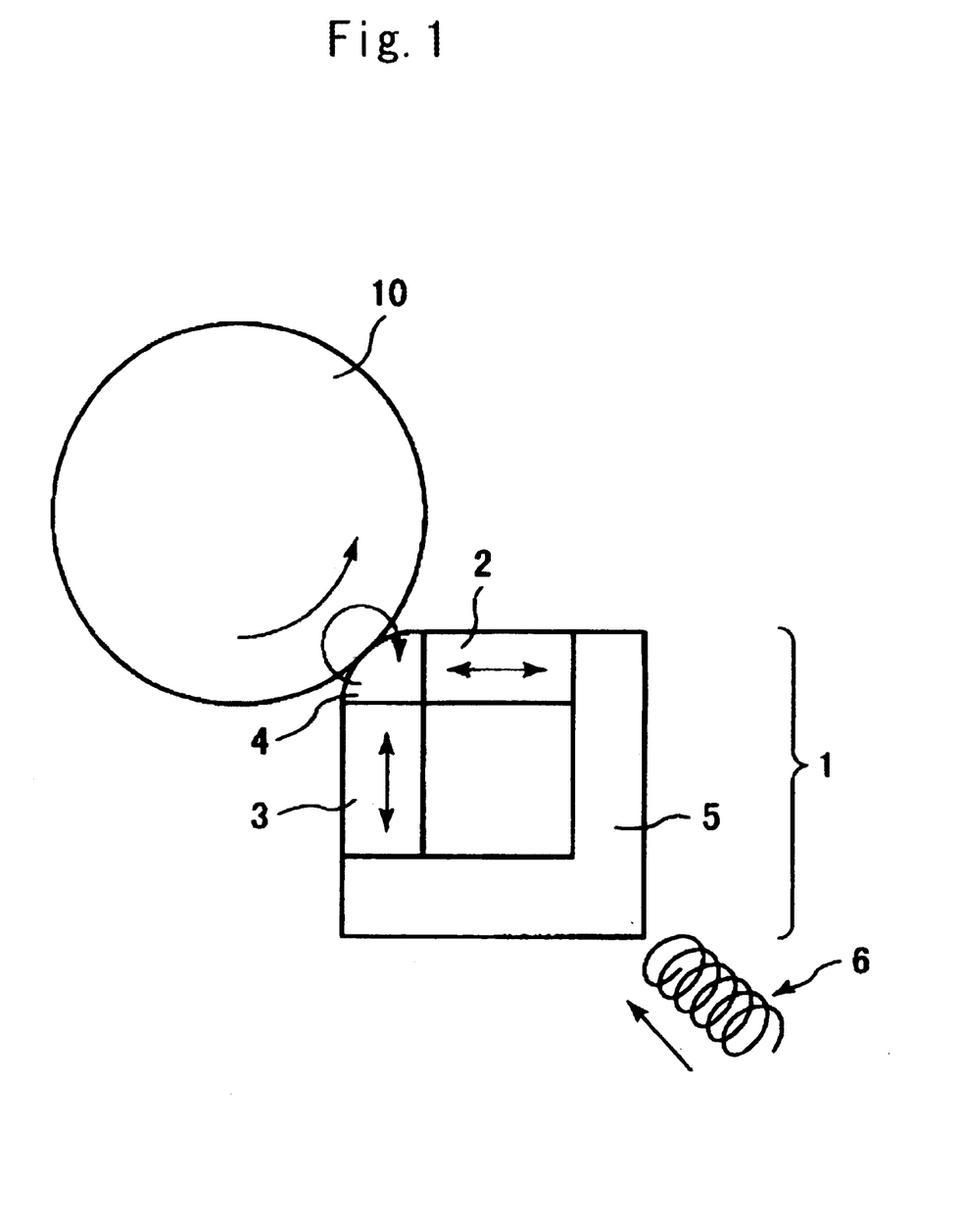
FIG. 1 is a simplified front elevation showing the construction of a truss actuator in which the drive control device pertaining to the present invention is applied.

FIG. 1 is a simplified front elevation showing the construction of a truss actuator in which the drive control device pertaining to the present invention is applied.

This truss actuator has a drive unit 1 and a pressure unit 6, and drives a disk-shape driven member 10 to rotate. The drive unit 1 comprises a first displacement unit 2 and a second displacement unit 3 that cross each other at a right angle, for example, a synthesizing unit 4 that is glued to the crossing point at the distal ends of the first and second displacement units 2 and 3, and a base frame 5 to which are glued the proximal ends of the first and second displacement units 2 and 3.

Layered piezoelectric elements that convert electric signals into displacement by virtue of a piezoelectric effect are used for the first and second displacement units 2 and 3. A durable metal material through which a high friction coefficient may be stably obtained, such as tungsten, is used for the synthesizing unit 4. A strong metal material that is easy to manufacture, such as stainless steel, is used for the base frame 5. For the gluing of these members, an epoxy resin adhesive agent offering superior adhesion power and strength is used.

The driven member 10 comprises a disk-shape rotor made of a metal such as iron or aluminum, for example, and in order to prevent wear thereto due to the contact with the synthesizing unit 4, its side surface is treated with Tufftride coating or alumite coating. The pressure unit 6 comprises a coil spring, for example, and is set such that it pressurizes the base frame 5 to move toward the center of the rotor, which is the driven member 10.

The drive control device pertaining to this embodiment that drives the truss actuator having the above construction drives only one of the first and second displacement units 2 and 3 depending on the intended direction of rotation of the driven member 10.

FIG. 2 shows the relationship between the drive frequency (horizontal axis) and the phase difference (vertical axis) between the displacement units 2 and 3 when only the first displacement unit 2 is driven. FIG. 2(a) shows the case in which the phase of the second displacement unit 3, which is the driven unit, advances relative to the phase of the first displacement unit 2, which is the driving unit, while FIG. 2(b) shows a case in which the phase of the second displacement unit 3 is delayed relative to the phase of the first displacement unit 2. The data of FIG. 2 is verified by the experiment.

As can be seen from FIG. 2, the phase difference between the first and second displacement units 2 and 3 changes in accordance with the drive frequency, and the relationship between the drive frequency and the phase difference is essentially linear. Specifically, when the drive frequency is reduced, the phase difference advances, and the when the drive frequency is increased, the phase difference is delayed.

This embodiment performs control using the relationship between the drive frequency and the phase difference between the displacement units shown in FIG. 2.

Incidentally, whether the phase of the second displacement unit, which is the driven unit, advances or is delayed is determined by the design of the truss actuator. Therefore, it is necessary, when changing the drive frequency, to determine whether the first displacement unit 2 or the second displacement unit 3 is made the driving unit depending on the intended direction of rotation of the driven member 10, in accordance with the characteristics of the designed truss actuator, i.e., in accordance with whether the phase of the second displacement unit advances or is delayed.

Figure 3:
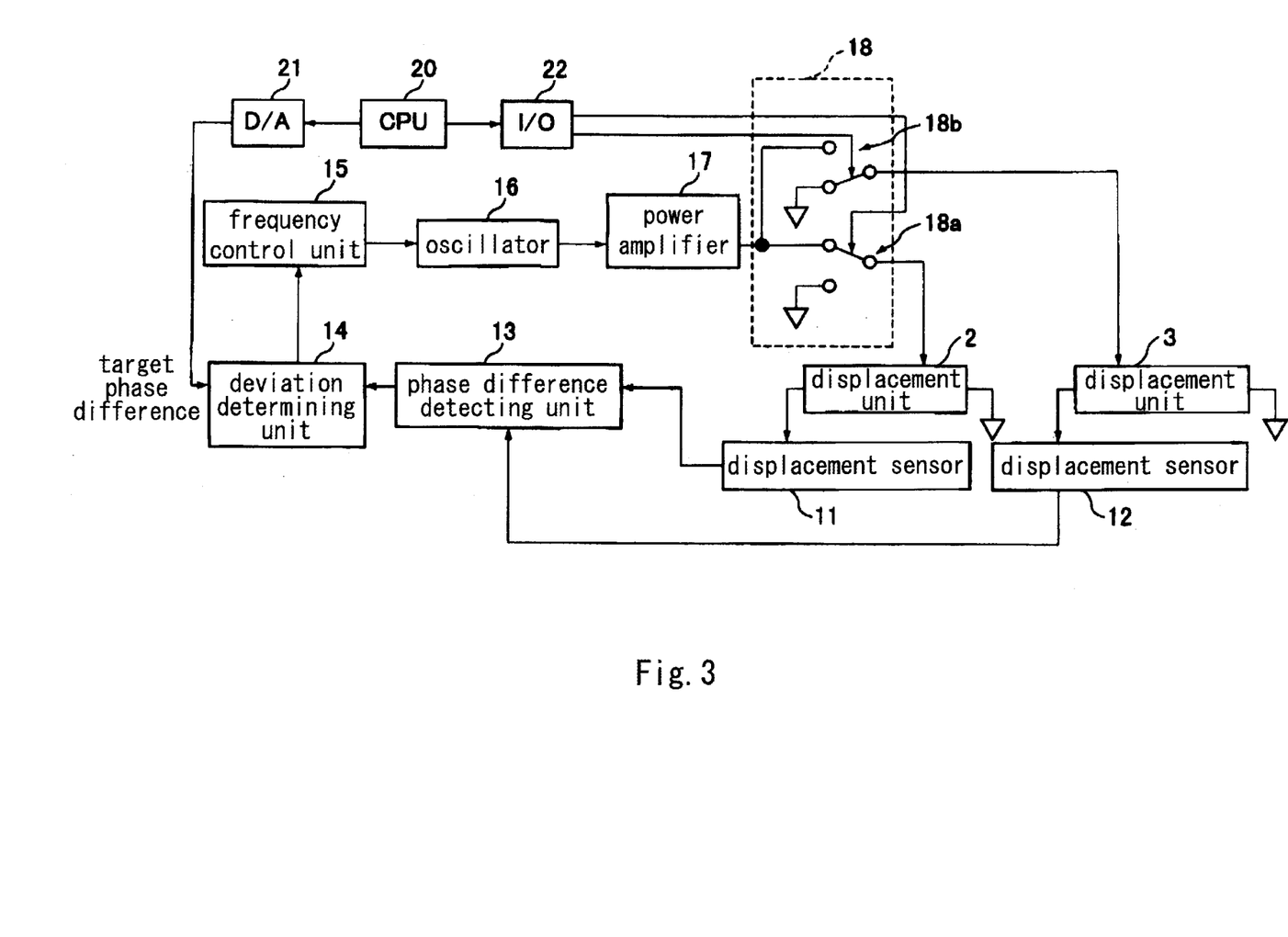
FIG. 3 is a block diagram showing the basic construction of the drive control device of the present invention.

FIG. 3 is a block diagram showing the basic construction of the drive control device of this embodiment.

This drive control device comprises displacement sensors 11 and 12 respectively mounted to the first and second displacement units 2 and 3, a phase difference detecting unit 13 that inputs signals from the displacement sensors 11 and 12, a deviation determining unit 14 into which signals from the phase difference detecting unit 13 are input and into which the target phase difference is input from the CPU 20 via the D/A converter 21, a frequency control unit 15 that inputs signals from the deviation determining unit 14, an oscillator 16 the oscillation frequency of which is controlled by the frequency control unit 15 and may be changed, a power amplifier 17 located on the output side of the oscillator 16, and an alternating switch 18 that selectively outputs signal sent from the CPU 20 via the I/O 22 to one of the first or second displacement units 2 and 3. The frequency control unit 15 and oscillator 16 comprise a frequency changing unit. The alternating switch 18 comprises a first switch unit 18a that turns ON when the first displacement unit 2 is driven, and a second switch unit 18b that is turned ON when the second displacement unit 3 is driven.

In this drive control device, the displacement sensors 11 and 12 respectively mounted to the displacement units 2 and 3 detect the displacement of the displacement units 2 and 3, the phase difference detecting unit 13 detects the phase difference between the displacements, and the deviation determining unit 14 determines the deviation of the detected phase difference from the phase difference detecting unit 13 and the target phase difference from the CPU 20. Based on the determined deviation, the frequency control unit 15 changes the oscillation frequency of the oscillator 16 in the direction in which the above deviation may be eliminated, i.e., it increases or decreases the current frequency by a certain amount, for example, in order to ultimately control the phase difference between the first displacement unit 2 and the second displacement unit 3. This translates into controlling the locus configuration of the synthesizing unit 4, i.e., the drive output to the driven member 10.

The driven member 10 may be made to rotate either clockwise or counterclockwise by alternating the ON/OFF status of the first switch unit 18a and the second switch unit 18b. For example, where the first displacement unit 2 has been the driving unit, the second displacement unit may be made the driving unit by alternating the switch.

In the drive control device of the present invention, by changing the frequency once or twice or more in the direction in which the deviation may be eliminated, the phase difference between the first displacement unit 2 and the second displacement unit 3 may be ultimately made to match the target phase difference given by the CPU 20. Therefore, even where there is fluctuation in the load on the truss actuator or in the environment in which the truss actuator is used, the drive control device of the present invention may control the output to the driven member 10 at a constant level.

In addition, the drive control device of the present invention may have a construction in which a target phase difference pattern is stored in a memory included in the CPU 20, for example. When such construction is used, the speed control or power control of the driven member 10 may be implemented using the stored pattern. Various patterns may be set and stored for this pattern. The most important factor is that the target phase difference pattern be set to a pattern by which to drive the driven member 10.

An example of the displacement sensor that may be used in the drive control device of the present invention will now be explained.

Figure 4:
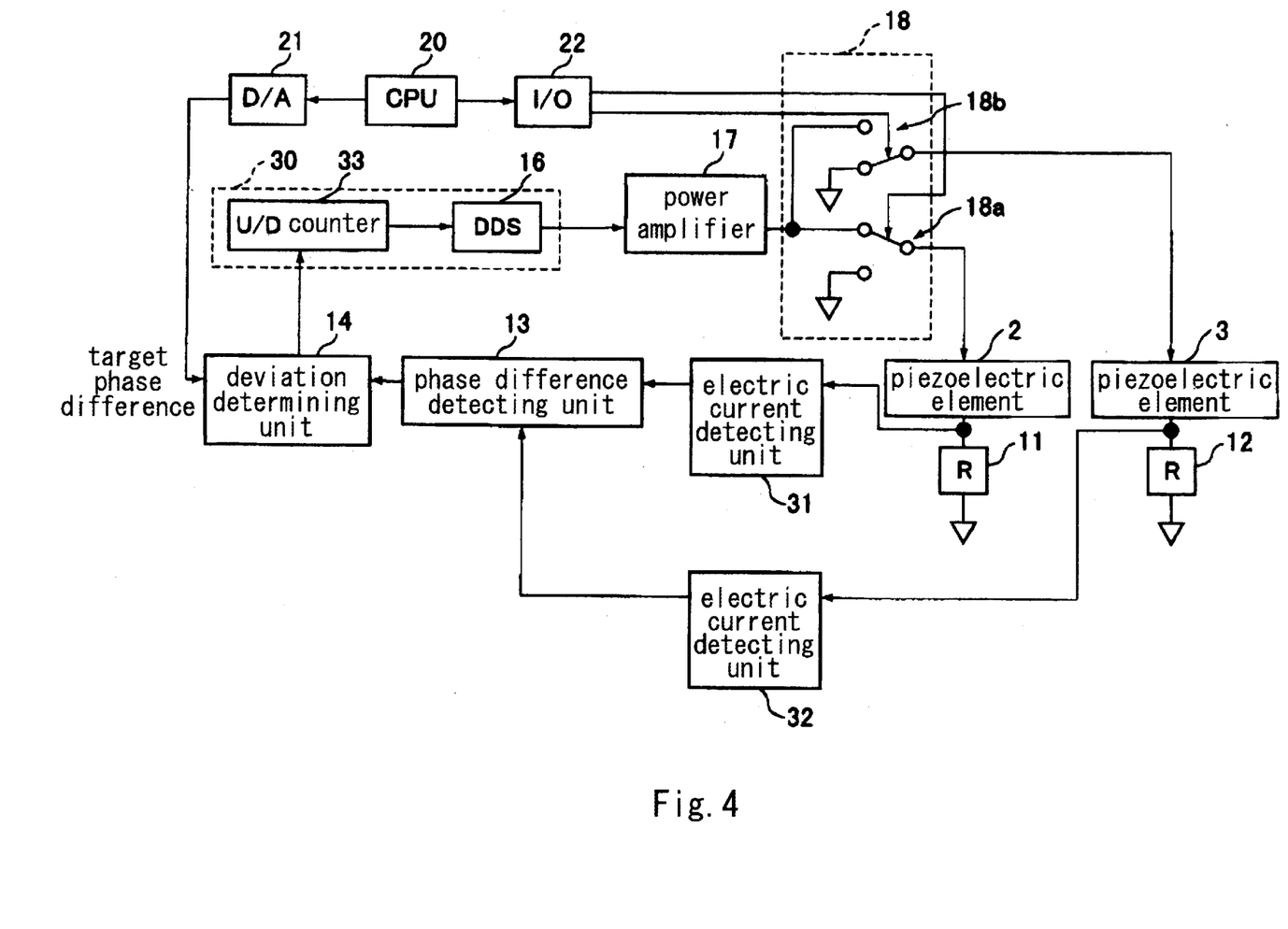
FIG. 4 is a block diagram of a construction in which resistors for current detection are used for the displacement detecting units of the drive control device of the present invention.

FIG. 4 is a block diagram showing a drive control device in which resistors R are used for the displacement sensors 11 and 12. Layered piezoelectric elements are used for the displacement units 2 and 3. In addition, a DDS (direct digital synthesizer) is used in place of the oscillator 16 in FIG. 3, and the frequency changing unit comprises the DDS and an up/down counter 33 located in front of the DDS 16.

In this case, the displacement sensors comprise the resistors R that are serially connected to the piezoelectric elements 2 and 3, respectively. The values of the electric current I flowing in the piezoelectric elements 2 and 3 are respectively measured by the electric current detecting units 31 and 32 through the detection of the values of the electric current as the voltage drops due to the resistors R. The electric current detecting unit 23 converts the electric current value I detected by its built-in zero cross comparator into a pulse signal and outputs it to the phase difference detecting unit 13.

In the case of this drive control device, because the displacement of the piezoelectric element 2 or 3 is essentially proportional to the value of the electric current I flowing in the piezoelectric element 2 or 3 due to the characteristics of the piezoelectric elements, the displacement of the piezoelectric elements 2 and 3 may be detected.

Examples of the phase difference detecting unit and deviation determining unit that may be used in a drive control device that outputs the displacement values of the piezoelectric elements 2 and 3 in the form of pulse signals from the electric current detecting units 31 and 32 to the phase difference detecting unit will now be explained.

Figure 5:
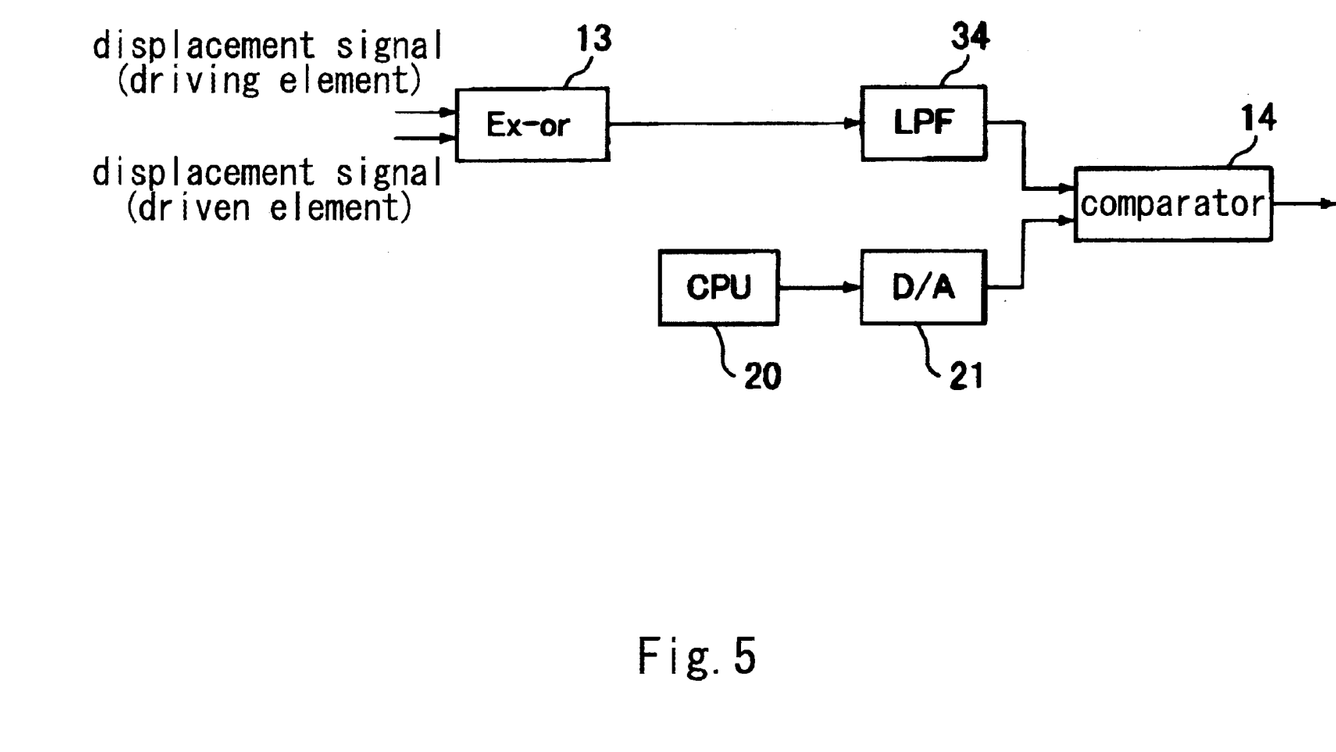
FIG. 5 is a block diagram showing an example of a circuit construction used in the phase different detecting unit and the deviation determining unit of the drive control device of the present invention.

FIG. 5 is a block diagram showing the phase difference detecting unit and deviation determining unit.

Figure 6:
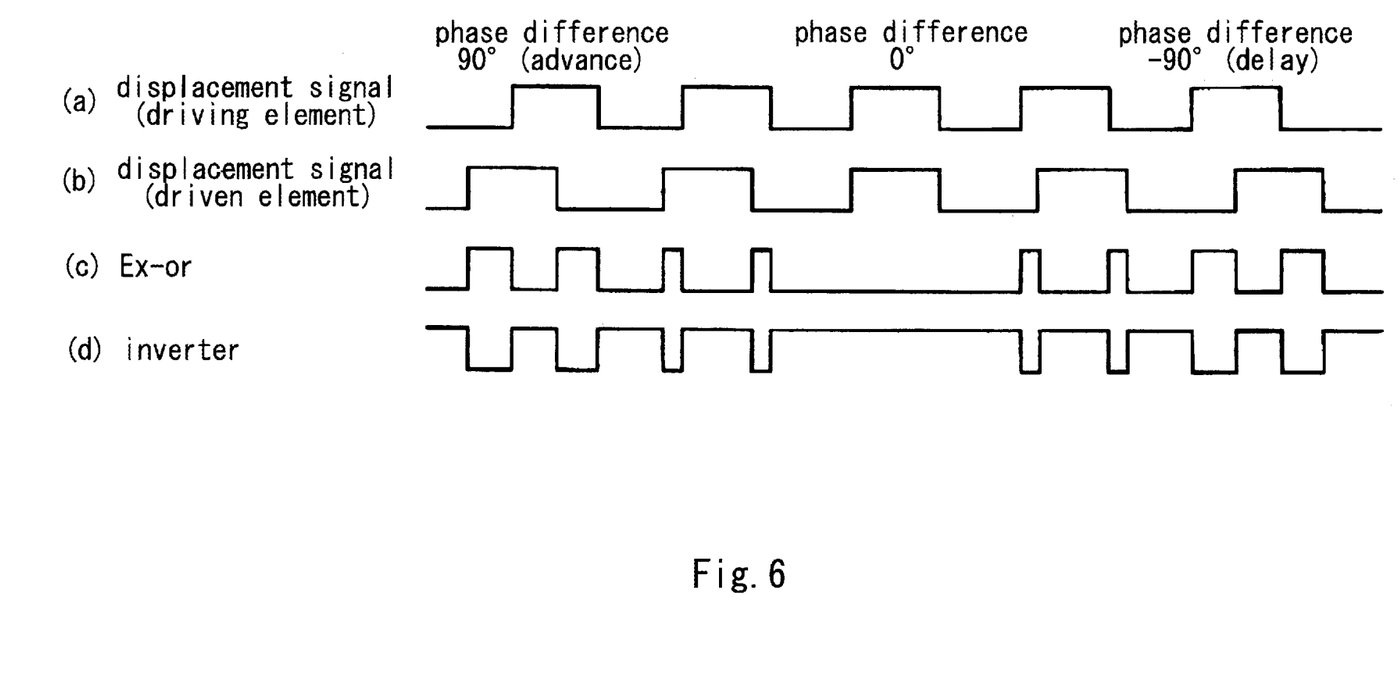
FIG. 6 is a drawing showing the signal output from the phase difference detecting unit to the deviation determining unit of the drive control device of the present invention with FIG. 6(a) showing the pulse waveform comprising the input signal (displacement signal) of the phase difference detecting unit, FIG. 6(b) showing the pulse waveform comprising the other input signal (displacement signal) of the phase difference detecting unit FIG. 6(c) showing a pulse waveform comprising the output signal of the phase difference detecting unit, and FIG. 6(d) showing a pulse waveform obtained by inverting the output signal of the phase difference detecting unit

This phase difference detecting unit comprises one Ex-Or circuit 13, and a displacement signal for the driving element, which is converted into the pulse signal shown in FIG. 6(*a*), and a displacement signal for the driven element, which is converted into the pulse signal shown in FIG. 6(*b*), are input thereto.

The output of the Ex-Or circuit 13 comprising the phase difference detecting unit comprises a pulse signal having a duty ratio corresponding to the phase difference between the displacement signals of FIG. 6(*a*) and FIG. 6(*b*), as shown in FIG. 6(*c*). This pulse signal is smoothed by the first LPF (low pass filter) 34 shown in FIG. 5, and specifically, is made into an output waveform P shown in FIG. 8. This output P and the voltage (the voltage A shown in FIG. 8) that indicates the target phase difference designated by the CPU 20 via the D/A converter 30 are compared by the comparator 14, which comprises a deviation determining unit, and it is determined whether the frequency should be increased or decreased by a certain amount such that the output P approaches the voltage A.

Figure 7:
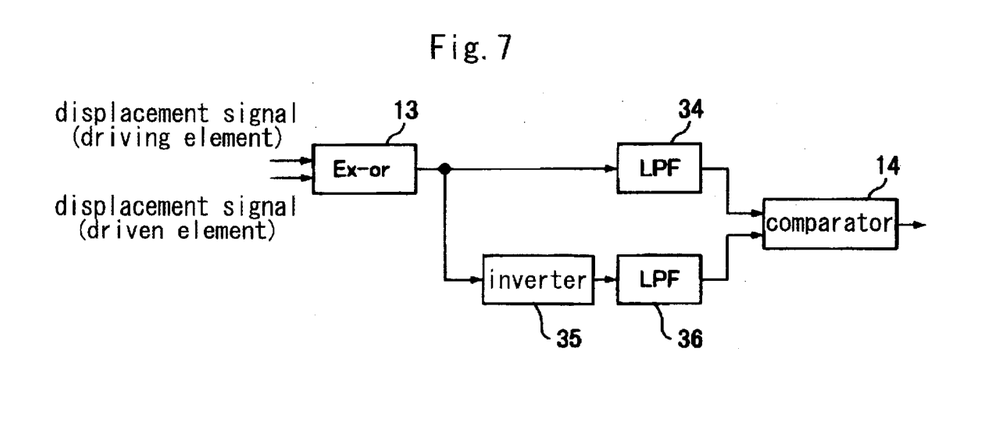
FIG. 7 is a block diagram showing another example of the circuit construction used in the phase difference detecting unit and deviation determining unit of the drive control device of the present invention.

In particular, where the target phase difference is 90°, the construction shown in FIG. 7 may be used. In other words, the output of the Ex-Or circuit 13, which comprises a phase difference detecting unit, is inverted by the inverter 35 (see FIG. 6(*d*)), and is smoothed by the second LPF 36.

Figure 8:
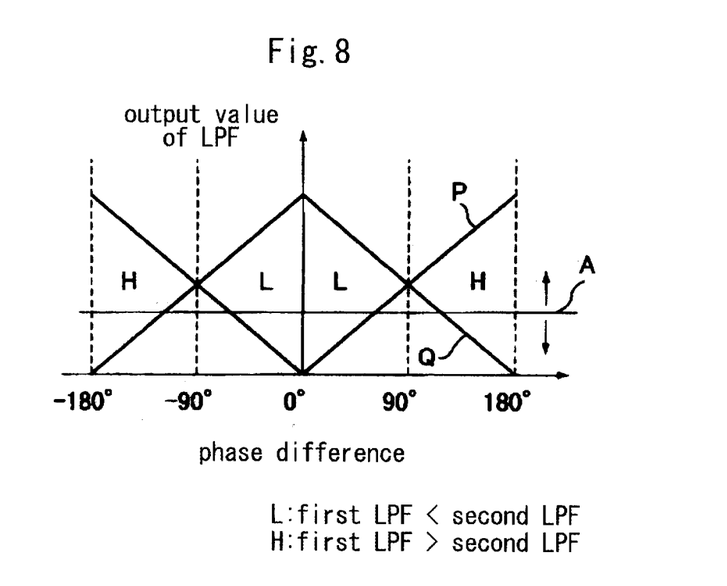
FIG. 8 is a drawing showing signal examples using the circuit constructions in FIG. 5 and FIG. 7.

In this case, the output values of the first and second LPFs 34 and 36 and the phase difference have the relationship shown in FIG. 8. In other words, the waveform of the signal output from the second LPF 36 becomes the waveform Q, which is an inverted waveform P of the signal output from the first LPF 34. The point at which the output value of the first LPF 34 and the output value of the second LPF 36 cross each other is the phase difference 90°. Therefore, the median output value between the output of the first LPF 34 and the output of the second LPF 36 is deemed the target phase difference (i.e., 90°), and when the detected phase difference (the output P) is high (H), the frequency is changed such that the output P decreases and approaches the target phase difference (the median output value), and conversely, when the detected phase difference (the output of 34) is low (L), the frequency is changed such that the output P increases and approaches the target phase difference (the median output value). Therefore, where the target phase difference is fixed as 90°, it is not necessary for the CPU 20 to designate a target value.

An example of the frequency changing unit that may be used in a drive control device that outputs the displacement values of the piezoelectric elements to the phase difference detecting unit from the electric current detecting units in the form of pulse signals will now be explained with reference to FIG. 4 referred to above. The frequency changing unit 30 in this case comprises a DDS, which works as an oscillator 16, and an up/down counter 33 located in front of the DDS.

The result of the determination made by the deviation determining unit 14 is input to the up/down counter 33, where the count value is changed such that the frequency is changed by a certain amount. The post-change count value is input to the DDS 16, which oscillates using the frequency (a sine wave) corresponding to the above count value.

Figure 9:
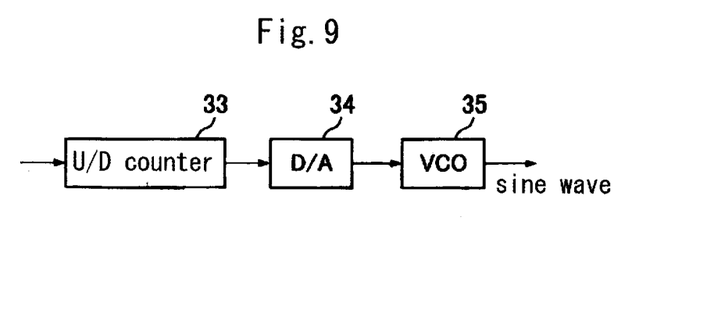
FIG. 9 is a block diagram showing the circuit construction of the frequency changing unit of the drive control device of the present invention.

It is also acceptable if the DDS 16, which works as an oscillator in FIG. 4, is replaced by a D/A converter 34 and VCO (voltage control oscillator) 35 as shown in FIG. 9. The same frequency change may be carried out in this case as well. Incidentally, the output waveform of the VCO 35 is a sine wave, but it does not necessarily assume this form.

Figure 10:
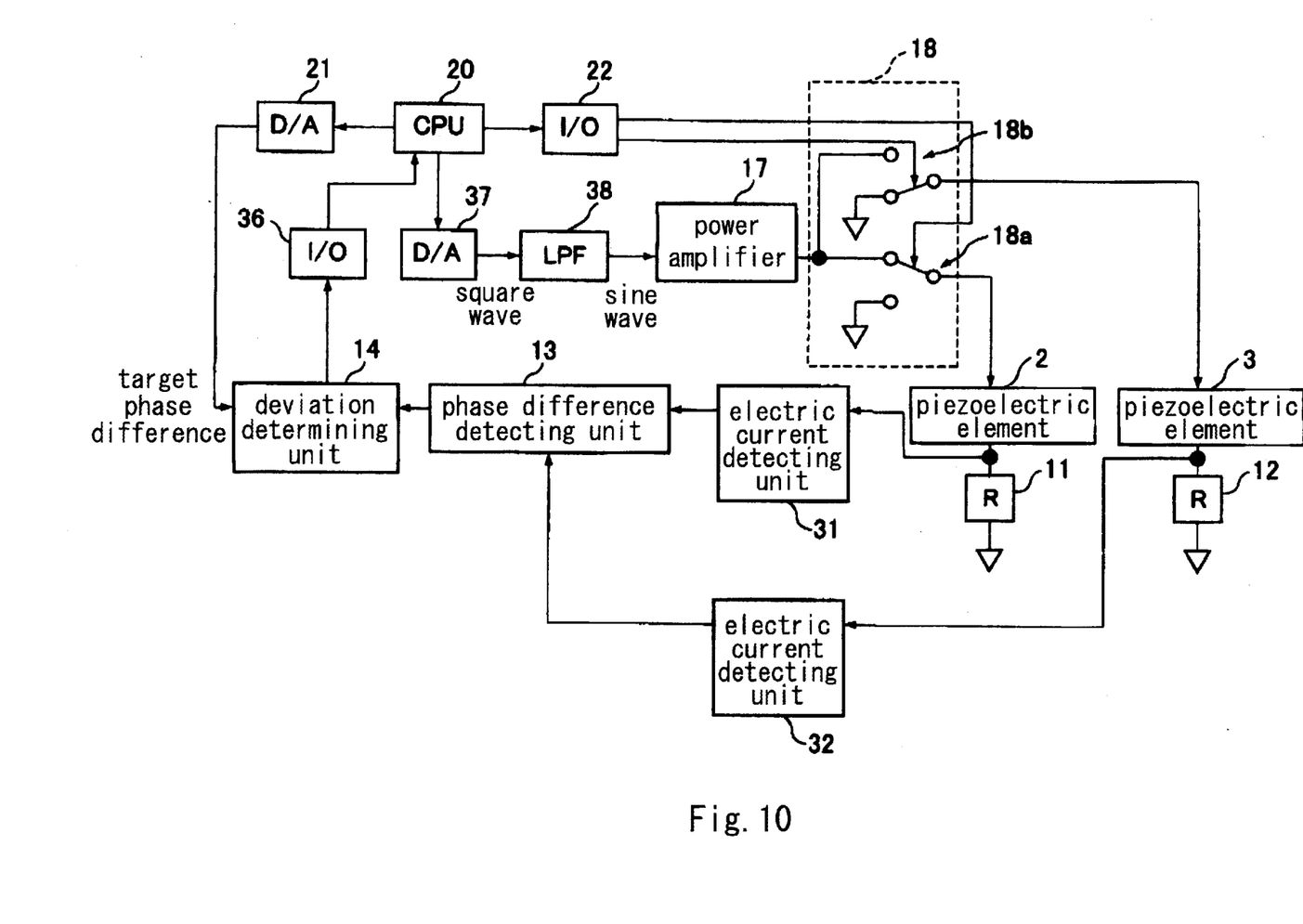
FIG. 10 is a block diagram showing another example of the construction of the drive control device of the present invention.

In addition, the drive control device of this embodiment may generate a signal that drives the displacement units using the CPU 20 as shown in FIG. 10. In other words, the difference between the target phase difference output from the CPU 20 via the D/A converter 21 and the phase difference detected by the phase difference detecting unit 13 is determined by the deviation determining unit 14, the result of this determination is input to the CPU 20 via the I/O 36, and the CPU 20 outputs a drive signal based on the above difference. Where the above DDS 16 or VCO 35 is used, the output waveform of these members is a sine wave, but in the drive control device shown in FIG. 10, the waveform of the signal output from the CPU 20 via the D/A converter 31 is a square wave, and therefore the output of the square wave is shaped into a sine wave by the LPF 38 before it is supplied to the power amplifier 17.

Although it is not clearly referred to in the above embodiment, where driving is performed using the drive control device of the present invention, the truss actuator including the above layered piezoelectric elements functions as a single-side drive-type truss actuator in which only one of the two displacement units is driven. In this single-side drive-type truss actuator, the piezoelectric element comprising a driven displacement unit works as an elastic member as well as a displacement sensor. Further, when the driving piezoelectric element is switched from one element to the other, the roles of the driving element and the driven element become reversed.

In the above embodiment, resistors are used as the displacement sensors, but the present invention is not limited to this implementation, and distortion gauges may be used instead. To explain in detail, in a truss actuator using the layered piezoelectric elements described above, when rectangular waves are directly used for the drive signal, pulsation appears in the electric current value of the driving element, resulting in improper phase detection. In such case, distortion gauges are glued to the displacement units to measure the displacements. The specific construction is explained below.

Figure 11:
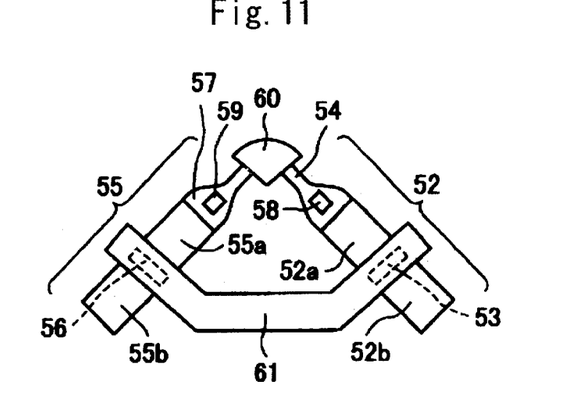
FIG. 11 is a simplified front elevation showing a truss actuator using elastic members for the displacement units, in which the drive control device of the present invention is applied.

FIG. 11 is a simplified front elevation showing a truss actuator using elastic members for the displacement units. In this example, bolt-tightened Langevin vibrators are used. Specifically, the displacement unit 52 comprises two metal column units 52a and 52b, an element unit 53 comprising two single-plate piezoelectric elements that are sandwiched by electrode plates on both sides and are located between the metal column units 52a and 52b, and a horn-shaped elastic unit 54 located on the side of the metal column unit 52a, and the whole unit is tightened by bolts. The other displacement unit 55 has an identical construction. It comprises two metal column units 55a and 55b, an element unit 56 comprising two single-plate piezoelectric elements that are sandwiched by electrode plates on both sides and are located between the metal column units 55a and 55b, and a horn-shaped elastic unit 57 located on the side of the metal column unit 55a, and the whole unit is tightened by bolts.

Both displacement units 52 and 55 are attached to a base frame 61 via the electrode plates comprising the element units 53 and 56, respectively, and a synthesizing unit 60 is fixed to both displacement units 52 and 55 at one end thereof (the upper side in the drawing). The displacement of the displacement units 52 and 55 is detected as a voltage value by distortion gauges 58 and 59 attached to the elastic units 54 and 57. The elastic units 54 and 57 have a tapered horn shape in order to increase the displacement.

Figure 12:
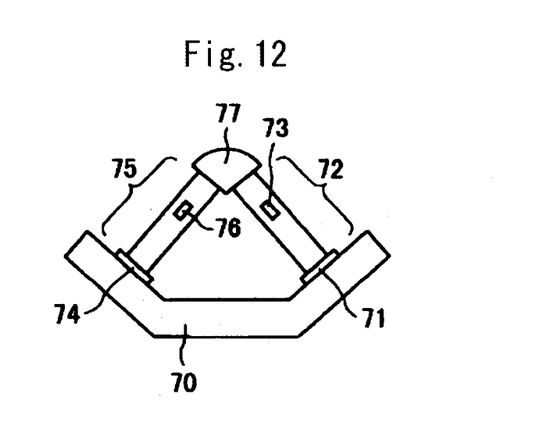
FIG. 12 is a simplified front elevation showing another truss actuator using elastic members for the displacement units, in which the drive control device of the present invention is applied.

FIG. 12 is a simplified front elevation showing another truss actuator using elastic members for the displacement units.

Single-plate piezoelectric elements 71 and 74 are located on a base frame 70, the proximal ends of the displacement units 72 and 75 comprising elastic members are connected to the single-plate piezoelectric elements 71 and 74, and a synthesizing unit 77 is fixed to the distal ends of the displacement members 72 and 75. Distortion gauges 73 and 76 are respectively mounted at the middle areas of the displacement units 72 and 75.

Because the electric current that flows in the single-plate piezoelectric element 71 or 74 is minute, it may be difficult to detect displacement through detection of the electric current, but because distortion gauges 73 and 76 are glued to the displacement units 72 and 75 so that displacement may be measured, detection of displacement may be reliably performed.

Figure 13:
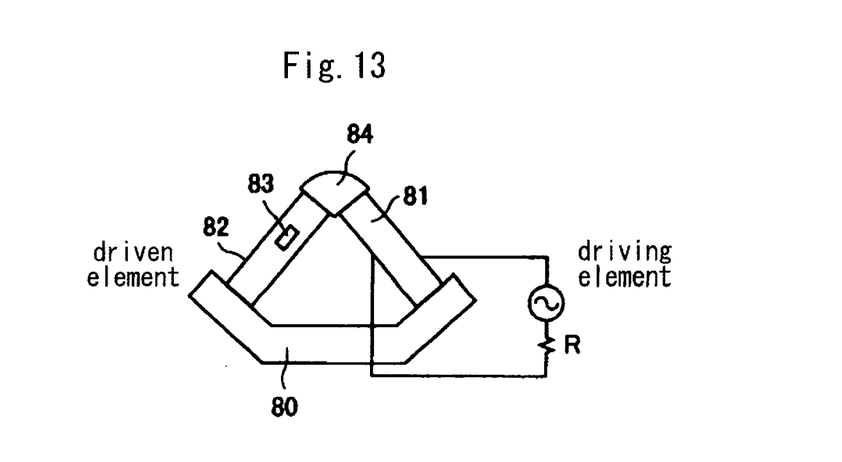
FIG. 13 is a simplified front elevation showing a truss actuator that may be applied when the driven member is rotated in one direction using the drive control device of the present invention.

FIG. 13 is a simplified front elevation showing a truss actuator that may be used when the driven member is rotated in one direction only.

With this truss actuator, one of the displacement units, i.e., a driving displacement unit 81, comprises a layered piezoelectric element while the other one, which is a driven displacement unit 82, comprises an elastic member. A resistor R by which to detect displacement is connected to the driving displacement unit 81, which comprises a layered piezoelectric element, and a distortion gauge 83 by which to detect the displacement is mounted to the driven displacement unit 82, which comprises an elastic member. Both displacement units 81 and 82 are fixed to a base frame 80 at the proximal end, and are attached to a synthesizing unit 84 on the distal end.

This construction offers the benefit of cost reduction because only one driving piezoelectric element can be used. Further, because the driven displacement unit 82 and base frame 80 may be integrally formed, an even larger cost reduction may be obtained. When this construction is used, a layered piezoelectric element or a combination of a single-plate piezoelectric element and an elastic member may be used as the driving displacement unit 81.

As described in detail above, using the present invention, the output to the driven member may be maintained at a constant level without being influenced by fluctuations in the load on the truss actuator or the use environment. In addition, because the locus of the synthesizing unit may be controlled through the setting of the target phase difference, speed control and power control of the driven member may be performed. In particular, where the synthesizing unit is driven such that it draws a circular or oval locus, unlike the case in which it is driven to draw a linear locus, the smooth contact of the synthesizing unit with the driven member reduces noise, vibration and wear. Furthermore, because only one of the displacement units may be a driving element, the driving circuit may be simplified, and power consumption may be reduced.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A truss actuator comprising:
 a drive unit including:
  a base frame having first and second distal ends,
  two displacement units each having a distal end and an end fixed to a respective one of the distal ends of the base frame, and
  a synthesizing unit located at the distal ends of the displacement units;
 a drive control device for driving the drive unit; and
 a pressure unit for causing the synthesizing unit to come into pressure contact with a driven member, which is the object of driving, wherein
 one of the two displacement units is a drive displacement unit and the other displacement unit is a driven displacement unit, and the drive displacement unit is driven to oscillate and this oscillation is transmitted to the driven displacement unit in order to drive the driven member, and
 the drive control device includes:
  two displacement detecting units for respectively detecting displacements of the two displacement units,
  a phase difference detecting unit for detecting a phase difference between detected displacement values of the displacement detecting units, a target phase difference setting unit for setting a target phase difference, a deviation determining unit for determining a deviation between the phase difference detected by the phase difference detecting unit and the target phase difference set by the target phase difference setting unit, and a frequency changing unit for changing a drive frequency of the drive displacement unit based on the deviation determined by the deviation determining unit.

2. The truss actuator as claimed in claim 1, further comprising:

a memory for storing the target phase difference to be set in the target phase difference setting unit, wherein the target phase difference is inputted by operator.

3. The truss actuator as claimed in claim 1, wherein the two displacement units each include a layered piezoelectric element, and the displacement detecting units each include a detection circuit for detecting the displacement of each piezoelectric element based on a value of an electric current that flows in the piezoelectric element.

4. The truss actuator as claimed in claim 1, wherein each of the displacement detecting units is respectively mounted on a corresponding one of the two displacement units and includes a distortion gauge for detecting the displacement thereof.

5. A driving method for driving a truss actuator comprising the steps of:

driving one of two displacement units, functioning as a drive displacement unit, to oscillate, this oscillation being transmitted to the other displacement unit, functioning as a driven displacement unit, in order to drive a drive unit, wherein each displacement unit respectively has a distal end and an end fixed to a respective distal end of a base frame having a first and second distal ends, the distal ends of the two displacement units compose the drive unit;

detecting a displacement of the two displacement units respectively;

detecting a phase difference between detected displacement values of the two displacement detecting units;

setting a target phase difference;

determining a deviation between the phase difference and the target phase difference; and changing a drive frequency of the drive displacement unit based on the determined deviation.

6. The driving method for driving a truss actuator according to claim 5, wherein the target phase difference is inputted by operator.

7. The driving method for driving a truss actuator according to claim 5, wherein the two displacement units each include a layered piezoelectric element, and the displacements of each piezoelectric element are detected by a value of an electric current that flows in the piezoelectric element.

8. The driving method for driving a truss actuator according to claim 5, wherein the displacements of the two displacement units are detected by a distortion gauge mounted on each of two displacement units.

9. A truss actuator comprising:

a drive unit including:

a base frame having first and second distal ends, two displacement units each having an end fixed to a respective one of the distal ends of the base frame, and a distal end, and a synthesizing unit located at the distal ends of the displacement units;

a drive control device for driving the drive unit; and a pressure unit that causes the synthesizing unit to come into pressure contact with a driven member, which is the object of driving, wherein one of the two displacement units is a drive displacement unit and the other displacement unit is a driven displacement unit, and the drive displacement unit is driven to oscillate and this oscillation is transmitted to the driven displacement unit under 90° target phase difference conditions in order to drive the driven member, and the drive control device includes:

two displacement detecting units for respectively detecting the displacement of the two displacement units and outputting the detected displacement as a pulse signal, a phase difference detecting unit for detecting a phase difference between the pulse signals output from the displacement detecting units, a first signal generating unit for generating a signal a level of which changes depending on the phase difference and based on a detection signal output from the phase difference detecting unit, a second signal generating unit for generating a signal a level of which changes in a direction opposite from that of the first signal depending on the phase difference and based on the detection signal output from the phase difference detecting unit, a deviation determining unit for determining a deviation between the signals output from the first and second signal generating units, and a frequency changing unit for changing a drive frequency of the drive displacement unit based on the deviation determined by the deviation determining unit.

10. The truss actuator as claimed in claim 9, wherein the phase difference detecting unit includes a logic circuit for outputting a pulse signal having a duty ration corresponding to the phase difference between the pulse signals output from the two displacement detecting units, the first signal generating unit includes a first smoothing circuit for smoothing the pulse signal output from the logic circuit, the second signal generating unit includes, an inverter circuit for inverting the phase of the pulse signal output from the logic circuit, and a second smoothing circuit for smoothing the pulse signal output from the inverter circuit, and said deviation determining unit includes a comparison circuit for comparing the levels of the two signals respectively output from the first and second signal generating units.

11. The truss actuator as claimed in claim 9, wherein the two displacement units each include a layered piezoelectric element, and the displacement detecting units each include a detection circuit for detecting the displacement of each piezoelectric element based on a value of an electric current that flows in the piezoelectric element.

12. The truss actuator as claimed in claim 9,
wherein each of the displacement detecting units in mounted on a corresponding one of the two displacement units and includes a distortion gauge for detecting the displacement thereof.

13. The driving method for driving a truss actuator comprising the steps of:
driving one of two displacement units, functioning as a drive unit, to oscillate and this oscillation is transmitted to the other displacement unit, functioning as a driven unit under 90° target phase difference conditions in order to drive a drive unit, wherein each displacement unit respectively has a distal end and an end fixed to a respective distal end of a base frame having first and second distal ends, the distal ends of the two displacement units compose the drive unit;
detecting a displacement of the two displacement units respectively, and outputting the detected displacement as a pulse signal;
detecting a phase difference between the pulse signals output of the two displacement units;
generating a first signal a level of which changes depending on the phase difference;
generating a second signal a level of which changes in a direction opposite from that of the first signal depending on the phase difference;
determining a deviation between the first and second signals; and
changing a drive frequency of the displacement unit based on the determined deviation.

14. A driving method for driving a truss actuator according to claim 13, wherein
the phase difference is detected by a logic circuit for outputting a pulse signal having a duty radio corresponding to the phase difference between the pulse signals output from the two displacement units,
the first signal is generated by a first smoothing circuit for smoothing the pulse signal output from the logic circuit,
the second signal is generated by an inverter circuit for inverting the phase of the pulse signal output from the logical circuit and a second smoothing circuit for smoothing the pulse signal output from the inverter circuit, and
the deviation is determined by a comparison circuit for comparing the levels of the first and second signals.

15. The driving method for driving a truss actuator according to claim 13, wherein
the two displacement units each include a layered piezoelectric element, and
displacement of each piezoelectric element is detected by a value of an electric current that flows in the piezoelectric element.

16. The driving method for driving a truss actuator according to claim 13,
wherein the displacements of the two displacement units are detected by a distortion gauge mounted on each of two displacement units.

17. A truss actuator comprising:
a drive unit including:
two displacement units each having a distal end and an end fixed to a respective one of the distal ends of the base frame, and
a synthesizing unit located at the distal ends of the displacement units;
a drive control device for driving the drive unit; and
a pressure unit for causing the synthesizing unit to come into pressure contact with a driven member, which is the object of driving, wherein
one of the two displacement units is a drive displacement unit and the other displacement unit is a driven displacement unit, and the drive displacement unit is driven to oscillate and this oscillation is transmitted to the driven displacement unit in order to drive the driven member, and
the drive control device includes:
two displacement detecting units for respectively detecting displacements of the two displacement units,
a phase difference detecting unit for detecting a phase difference between detected displacement values of the displacement detecting units,
a deviation determining unit for determining a deviation between the phase difference detected by the phase difference detecting unit and a predetermined target phase difference, and
a frequency changing unit for changing a drive frequency of the drive displacement unit based on the deviation determined by the deviation determining unit.

* * * * *